US011645414B2

(12) United States Patent
Barlik et al.

(10) Patent No.: US 11,645,414 B2
(45) Date of Patent: May 9, 2023

(54) DATA PRIVACY OPT IN/OUT SOLUTION

(71) Applicant: COX COMMUNICATIONS, INC., Atlanta, GA (US)

(72) Inventors: Len Barlik, Atlanta, GA (US); William Bayless Bracker, Marietta, GA (US); Matthew Edwin Carothers, Dunwoody, GA (US); Donald W. Johnson, Decatur, GA (US); Michael J. Pacifico, Johns Creek, GA (US); Jemin Thakkar, Johns Creek, GA (US); Christian Ulf Welin, Dunwoody, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 632 days.

(21) Appl. No.: 16/530,666

(22) Filed: Aug. 2, 2019

(65) Prior Publication Data
US 2020/0159955 A1     May 21, 2020

Related U.S. Application Data

(60) Provisional application No. 62/714,208, filed on Aug. 3, 2018.

(51) Int. Cl.
*G06F 21/62* (2013.01)
*G06Q 50/26* (2012.01)

(52) U.S. Cl.
CPC ....... *G06F 21/6245* (2013.01); *G06Q 50/265* (2013.01)

(58) Field of Classification Search
CPC .......................... G06F 21/6245; G06Q 50/265
USPC .......................................................... 726/26
See application file for complete search history.

(56) References Cited

U.S. PATENT DOCUMENTS

| 10,956,586 | B2* | 3/2021 | Sadeh | G06F 21/6245 |
| 11,044,220 | B1* | 6/2021 | Perlow | H04L 51/216 |
| 11,061,977 | B1* | 7/2021 | Raskar | H04N 21/4532 |
| 2004/0054918 | A1* | 3/2004 | Duri | G06Q 20/383 |
| | | | | 705/64 |
| 2013/0311562 | A1* | 11/2013 | Platt | H04L 67/01 |
| | | | | 709/204 |
| 2014/0099920 | A1* | 4/2014 | Belanger | H04L 63/107 |
| | | | | 455/411 |
| 2017/0017638 | A1* | 1/2017 | Satyavarta | G06Q 50/01 |
| 2018/0174190 | A1* | 6/2018 | Ferreira | G06Q 50/01 |
| 2018/0247077 | A1* | 8/2018 | Barrett-Bowen | H04L 63/102 |

(Continued)

OTHER PUBLICATIONS

NPL Search Terms (Year: 2022).*

*Primary Examiner* — Syed A Zaidi
(74) *Attorney, Agent, or Firm* — Eversheds-Sutherland (US) LLP

(57) ABSTRACT

Systems, methods, and computer readable media for providing a streamlined, comprehensive data privacy opt in and opt out solution. Data privacy laws, also known as data protection laws or consumer privacy laws, prohibit the disclosure or misuse of information held on private individuals. A first device may receive a request from a second device, the request associated with a user. The first device may determine, and based on the user, a privacy regulation. The device may determine a setting associated with the privacy regulation. The device may send, to the second device, the setting.

17 Claims, 7 Drawing Sheets

(56) References Cited

U.S. PATENT DOCUMENTS

2019/0342336 A1\* 11/2019 Finkelstein ......... H04L 63/0428
2020/0402143 A1\* 12/2020 Gutnik .................... H04W 4/21

\* cited by examiner

DATA PRIVACY OPT IN/OUT SOLUTION

BACKGROUND

In recent years, comprehensive data privacy laws, also known as data protection laws or consumer privacy laws, prohibiting the disclosure or misuse of information held on private individuals have been adopted in numerous countries throughout the world. For example, the European Union recently enacted the General Data Protection Regulation (GDPR), greatly restricting the collection, retention, and use of an individual's personal data. In the United States, California is poised to pass the California Consumer Privacy Act (CCPA), similarly restricting the use of personal data. As a direct consequence of the growing adoption rate of these data privacy laws by various jurisdictions, and the potentially high penalties and fees leveraged against those companies and individuals who fail to comply with these regulations, ensuring data privacy compliance has become increasingly important.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Figure 1:
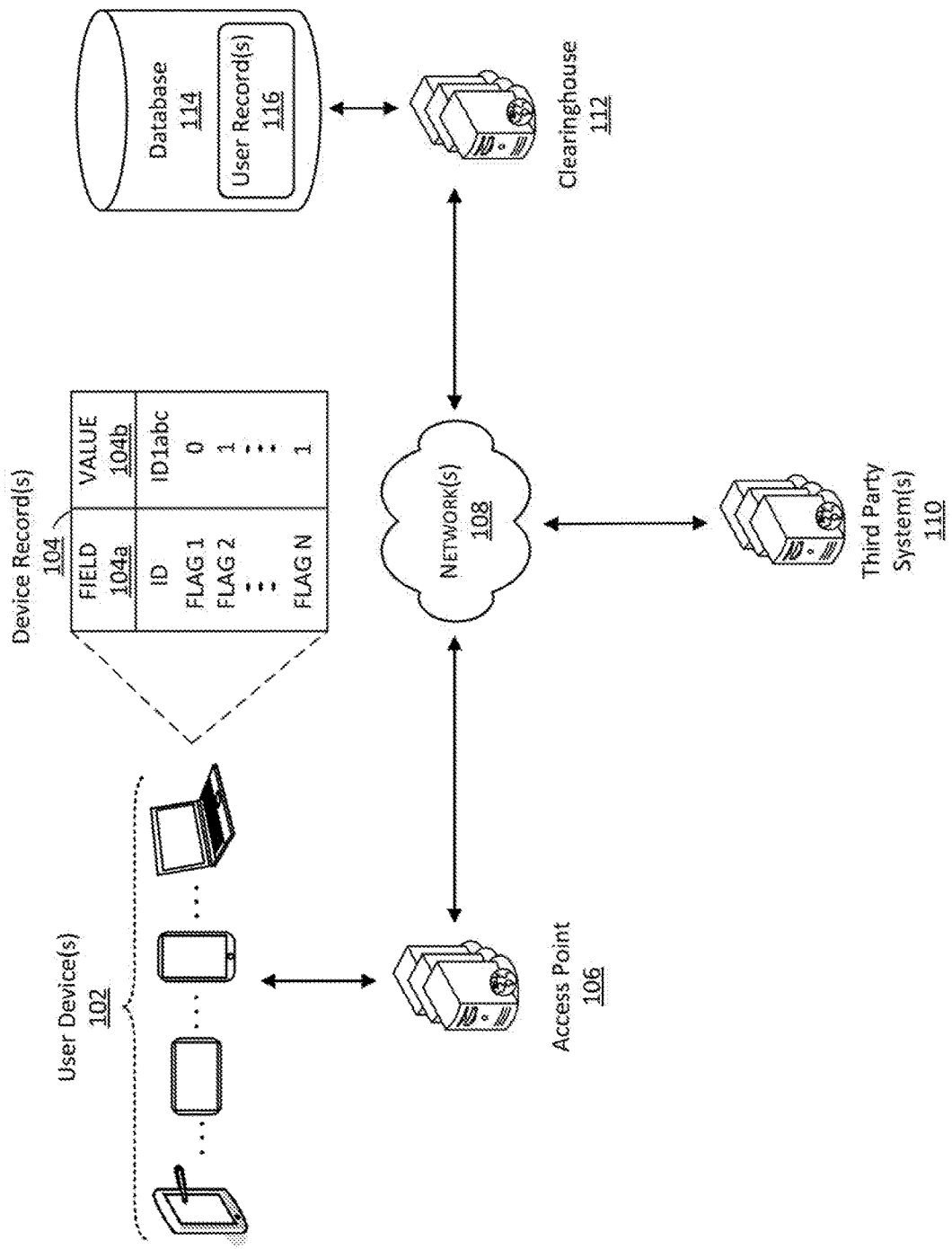
FIG. 1 is a schematic diagram of an illustrative system architecture for providing streamlined data privacy opt in/out management, in accordance with one or more example embodiments of the disclosure.

Example embodiments described herein provide certain systems, methods, and devices for a data opt in and opt out solution. Many stakeholders in online commerce have access to personal data such as, for example, Internet browsing habits, purchase history, or even user preferences, as well as information provided or obtained through social media, likes and dislikes, etc. While not all personal data may be sensitive, in the wrong hands, this kind of information may have a negative impact on the individuals or entities whose sensitive personal data is collected, including the selling, renting, releasing, disclosing, disseminating, making available, transferring or otherwise communicating a consumer's personal information to a third party for monetary gain.

Beyond this personal cost, data privacy compliance has become increasingly important in recent years due in part to the potentially enormous penalties and fees leveraged against those companies and individuals who fail to comply with the various comprehensive data privacy laws. Breaches in data privacy resulting in the misuse of personally identifiable information are easy fodder for media outlets, and such breaches may result in severe damage to a company's reputation. Moreover, a company or organization that collected personal information and that was under an obligation to maintain its confidentiality and security may be subjected to a large potential liability and costly remedial actions. These breaches may result in not only financial loss, but loss of credibility, confidence, and trust from individuals, stakeholders, and the public.

Ensuring data privacy compliance can be difficult, however, as each jurisdiction may enact one or more unique data privacy laws with distinct compliance requirements. Complicating matters further, a given customer pool may include customers subjected to different data privacy laws, for instance, from state to state. Without a streamlined effort, simply maintaining compliance with the various data privacy laws can be exceedingly expensive, in terms of capital costs, operating costs, and employee (e.g., compliance officer) time.

Some jurisdictions have privacy laws allowing online users to delete some information from their online user history. Complying with the privacy laws may require identifying information associated with an online user and deleting some of the information. However, identifying all relevant online user information may be costly from time, resource, and processing perspectives. When multiple computer systems have access to information for an online user, each of the computer systems may have to identify and delete online user information, thereby multiplying the inefficiencies of doing so, and perhaps requiring an online user to request the multiple services to delete their information (e.g., an online user may have to make many deletion requests). Therefore, an enhanced data privacy opt in/opt out solution may improve the efficiency of processing requests to delete online user information.

Embodiments of the disclosure include devices, systems, methods, computer-readable media, techniques, and methodologies for providing a streamlined solution for dynamically managing data privacy opt ins/outs for an arbitrary number of individuals. Certain embodiments provide new techniques for tracking and managing an individual's opt ins/outs for any number of data privacy laws. Although described primarily in the context of the European Union's enacted General Data Protection Regulation (GDPR) and California's Consumer Privacy Act (CCPA), aspects of the invention may be applied to various other forms of data privacy laws for any jurisdiction.

In one or more embodiments, a compliance service may facilitate the compliance of computer systems with laws and regulations by serving as a clearinghouse compliance service for multiple computer systems, which may include other clearinghouses. For example, the clearinghouse compliance service may identify an online user request to opt into data privacy protection (e.g., to opt out of some data collection capabilities of computer systems), and may communicate to multiple computer systems (e.g., online services) that the online user has requested the deletion of some of the user's information (e.g., Internet browsing habits, purchase history, or even user preferences, as well as information provided or obtained through social media, likes and dislikes, etc.). In this manner, the online user may not need to provide requests to each service to opt out of data collection capabilities. For example, when the clearinghouse service notifies an online service of a user's preference to opt out of data collection and/or targeted content, the online service may need to adjust processes to avoid data collection and/or content targeting to comply with laws, regulations, and/or user preferences.

In one or more embodiments, when a computer service identifies an online user, the computer service may request from the clearinghouse service a confirmation of whether the user has opted into data collection and/or targeted content. For example, when an online user signs into an account or enters a search query, the computer service may need to determine whether the online user has opted into data collection and/or targeted content so that the computer service can determine whether it may collect, analyze, and share the online user's information, and whether the computer service may present targeted content for the online user. The computer service may request an opt in or opt out confirmation from the clearinghouse service, and the clearinghouse service may respond with an indication of which privacy protections the online user has opted into and out of, and which privacy settings the online user has selected. In this manner, the clearinghouse service may notify computer services when a user has opted into or out of privacy settings, and the clearinghouse service may respond to requests from computer services regarding whether the online user has opted into or out of the privacy settings.

In one or more embodiments, an online user may select an opt in/out on a device, and the device may send the opt in/out selection to the clearinghouse service or to another service, device, network, or system that may provide the user opt in/out selection to the clearinghouse service. In this manner, the clearinghouse service may be provided any user privacy setting before a computer service requests the online user's privacy settings from the clearinghouse.

In one or more embodiments, the clearinghouse service may identify an online user's Internet protocol (IP) address, the online user's account, or other information about the online user or the online user's device. Any clearinghouse service may manage privacy settings for one or more IP addresses, user account contact addresses, billing addresses, or other information. When a service requests an online user's privacy settings from the clearinghouse service, the service may indicate to the clearinghouse service the user's IP address or other information, allowing the clearinghouse service to identify the online user and the online user's privacy settings (e.g., an opt in or opt out). The clearinghouse service may determine where an online user lives (with applicable user consent and compliance with any laws and regulations) based on a user account, and based on the user's location (e.g., where the user lives), the clearinghouse service may determine whether the user has opted into or out of any relevant privacy laws or regulations for the location. The clearinghouse service may use browser cookies to identify a user, allowing the clearinghouse service to be agnostic of Internet service providers (ISPs).

In one or more embodiments, a clearinghouse service may have access to ISP data, such as online users and their respective residences, IP addresses, and the like. Based on the IP address or ISP of an online user, the clearinghouse service may identify an online user and which opt ins and opt outs have been selected by the user and are applicable given the user's residence. A user may log into a third party service, and the third party service may indicate a user's ISP address to the clearinghouse service. A user may log into an ISP or an account with the clearinghouse service, and the clearinghouse service may determine the user's location and relevant privacy settings for the location.

In one or more embodiments, a clearinghouse service may store rules associated with applicable laws and regulations for any jurisdiction. When the clearinghouse service identifies an online user and the online user's location (e.g., place of residence), the clearinghouse service may determine the rules for the online user's location, such as privacy, data sharing, and content targeting rules. The clearinghouse service may determine whether the online user has provided any opt in or opt out selections for any respective rules and may provide an indication to one or more computer services that the computer services may or may not collect, analyze, share, or target information or content for the online user based on the online user's selections.

In one or more embodiments, with applicable consent of computer services, the clearinghouse service may analyze compliance of any computer service with applicable privacy and data sharing or targeting laws and regulations. The clearinghouse service may send messages requesting online user feedback regarding whether a computer service complied with laws and regulations, such as messages requesting an online user to indicate whether any violations are noticeable (e.g., whether the online user has noticed tracking or content targeting by an online system). The clearinghouse service may request that a computer service provide confirmation that online user privacy settings were implemented. The clearinghouse service may collect information and metrics provided by online users and/or computer systems and may analyze the information to determine whether any non-compliance issues have occurred, to which laws and regulations, to which jurisdictions, which computer services were responsible for non-compliances, and metrics such as percentage of compliance or non-compliance. The clearinghouse service may report the metrics to online users and/or to computer services.

In one or more embodiments, for the clearinghouse service to monitor compliance, the clearinghouse service may create test clients (e.g., robot clients). For example, an online user may use an application or tool executing on a device that, with the online user's consent, may execute and inspect the user's online traffic with one or more computer services (e.g., web browsers, social media, online merchants, etc.). The application or tool may provide feedback to the clearinghouse service indicating whether the online user's selected opt ins or opt outs are followed. For example, a web browser tool may execute with a web browser and may indicate to the clearinghouse service whether the online user's opt in and opt out selections are implemented or not.

In one or more embodiments, multiple clearinghouse services may perform clearinghouse service actions for monitoring and facilitating the use of online user privacy opt ins and opt outs. For any number of clearinghouse services (e.g., a network of clearinghouse services), a main clearinghouse service may be used as an endpoint for computer services requesting online user opt in and opt out information. For example, clearinghouse services may communicate to computer services which clearinghouse service from which to request online user opt ins and opt outs. Clearinghouse services may communicate with one another to request and receive online user opt in and opt out information. For example, one clearinghouse service may provide information for an online user and/or a particular jurisdiction to another clearinghouse service.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 is a schematic diagram of an illustrative system architecture for providing streamlined data privacy opt in/out management, in accordance with one or more example embodiments of the disclosure. As depicted in FIG. 1, the system architecture may include one or more user device(s) 102, each having one or more device record(s) 104, an access point 106, one or more network(s) 108, one or more third party system(s) 110, a clearinghouse 112 (also referred to as a "policy server" or as a "data policy clearinghouse"), and a database 114 storing one or more user record(s) 116.

In some embodiments, a consumer or user may access one or more resources (e.g., the Internet, a cable access network, the networks 108, the third party systems 110, etc.) directly or via the access point 106 using the user device 102. The user device 102 may include any suitable processor-driven device including, but not limited to, a mobile device or a non-mobile, e.g., a static, device. For example, the user device 102 may include a digital set-top box, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a Blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc., may also be included in this list.

The third party systems 110 may include, for example, a destination address (e.g., a website navigated to by a user operating the user device 102), an advertiser (e.g., an advertiser associated with an advert on a website visited while using the user device 102), or any other third party system (e.g., a data analytics company that collects data protected by one or more data privacy laws). The third party systems 110 may provide websites, user interfaces, applications, social media platforms, and other online content. The third party systems 110 may track online user behavior (e.g., which websites an online user has visited, which content an online user has viewed or otherwise interacted with, which items have been purchased by an online user, etc.). The third party systems 110 may track online user actions, communicate the actions to other systems, and generate targeted ads or other content based on the actions. The third party systems 110 may request from the clearinghouse 112 whether the third party systems 110 may perform such tracking and analysis of online user actions and content. The third party systems 110 may provide requests for online user settings (e.g., opt ins and opt outs) with respect to privacy rules and regulations. The requests may identify the online user and a location of the online user to allow the clearinghouse 112 to determine whether the online user has opted into or out of respective rules and regulations for a jurisdiction associated with the online user's location. The third party systems 110 may receive online user settings from the clearinghouse 112, and may determine whether the third party systems 110 may collect, analyze, or otherwise monitor and use online user activity. The third party systems 110 may have to delete some online user information for compliance based on the online user's settings, and may activate or deactivate some tracking, analysis, and content generation functions based on the online user's settings. The third party systems 110 may receive instructions from the clearinghouse 112 indicating which clearinghouse service from which to request online user privacy settings. The third party systems 110 may elect to have their compliance monitored and/or analyzed by the clearinghouse 112, may provide compliance information to the clearinghouse 112, and may receive reports or metrics from the clearinghouse 112 indicating the performance of the third party systems 110 with regard to following a user's privacy elections for various laws and regulations.

In some embodiments, the user device 102 is required to provide or otherwise identify one or more data privacy law opt in or opt out indicators prior to or when attempting to access the one or more resources (e.g., the Internet, a cable access network, the networks 108, the third party systems 110, etc.). In some embodiments, each of the data privacy law opt in or opt out indicators are associated with a particular data privacy law and/or a specific permission associated with a particular data privacy law. For example, a first indicator (e.g., FLAG 1, as depicted in FIG. 1) may be associated with the California Consumer Privacy Act (CCPA) permission regarding the tracking and use of data associated with the user device 102 for monetization activity by a third party (e.g., the third party systems 110). The indicator may have a first value (e.g., a single bit equal to "0") to designate an opt in with respect to the particular permission, and may have a second value (e.g., "1") to designate an opt out with respect to the particular permission. In other words, the value of the FLAG1 indicator may depend on whether the consumer has opted in to allow their activity on the user device 102 to be tracked or, alternatively, whether the consumer has opted out to prevent the tracking of their activity. While discussed with respect to the CCPA, it is understood that the opt in and opt out indicators may be associated with any data privacy law and with any particular data privacy law permission.

Record of the opt in/out determination by the user may be maintained on the device and/or in a central database. In some embodiments, the user device 102 stores or otherwise maintains the opt in and opt out indicators in one or more device records 104 on the user device 102. The device records 104 may include one or more data fields 104a having values 104b. As depicted, the device record 104 includes an "ID" data field having a value of "ID1abc" and various opt in or opt out permission indictor fields (e.g., FLAG1, FLAG2, FLAG N) having various opt in or opt out permission values (e.g., 0, 1, 1, respectively).

In some embodiments, the opt in and opt out indicators for one or more users using one or more user devices 102 are maintained and remotely managed by the clearinghouse 112. The clearinghouse 112 may include, for example, a remote server and/or database (e.g., a web server). In some embodiments, the clearinghouse 112 stores the indicators for a particular user in a unique user record 116 on a database 114. In this manner, a large number of opt in or opt out indicators associated with a wide range of data privacy laws and an arbitrary number of users can be efficiently and centrally maintained by a single system. In some embodiments, the opt in and opt out indicators for one or more users using one or more user devices 102 may be maintained and locally managed by the access point 106.

In some embodiments, the user device 102 is required to provide the data privacy law opt in or opt out indicators when accessing the one or more resources (e.g., the Internet, a cable access network, the networks 108, the third party systems 110, etc.) for the first time. For example, the user device 102 may be required to provide the indicators during a registration process. In other words, when the user device 102 accesses the networks 108 via the access point 106 for the first time, the user device 102 may be required to register. During this registration process, the user of the user device 102 may be presented with one or more data privacy inquiries regarding one or more opt in or opt out permissions associated with one or more data privacy laws. For example, during registration the user device 102 may be presented with a CCPA inquiry regarding the tracking and use of data associated with the user device 102 for monetization activity by the third party systems 110.

In some embodiments, the user's response to the data privacy inquiries are transmitted to the clearinghouse 112. In some embodiments, the user records 116 are updated in response to the clearinghouse 112 receiving the user's response to the data privacy inquiries. For example, an entry associated with a particular permission of a particular data privacy law not already stored in the user records 116 may be generated for the user. In another example, an entry stored in the user records 116 may be updated (changed) to reflect the newly received user response. In some embodiments, the user device 102 is required to periodically (e.g., once a month, annually, after five successive accesses of the one or more resources, etc.) update or confirm the provided data privacy law opt in or opt out indicators maintained in the user records 116.

Once the opt in and opt out indicators are identified for the user device 102, locally on the user device 102 and/or remotely at the clearinghouse 112, the third party systems 110 can use these indicators to quickly determine the data privacy law permissions for that user device 102 for a particular user session. In some embodiments, the third party systems 110 retrieve these opt in and opt out indicators directly from the user devices 102.

The data privacy opt in/out indicators may be provided to the third party systems 110 using, for example, a data frame, a user datagram protocol (UDP) packet, a transmission control protocol (TCP) packet, a customized flag, or any other handshake technology used over the Internet (such as HTTP, TCP/IP, etc.). The data frame, UDP packet, or customized flag may include an identifier, such as the MAC address of the user device 102, and an indication of the user's opting in/out determinations, but may alternatively be encoded in any manner to indicate such to third party system 110. In some embodiments, the third party system 110 may, in response to receiving the data frame from the user device 102, inquire directly with the clearinghouse 112 for more information pertaining to the user's data privacy inquiry. In some embodiments, the user device 102 only provides an identifier and an indication to the third party system 110 that one or more data privacy opt in/out permissions have been registered with the clearinghouse 112.

In some embodiments, the user device 102 sends a data frame (e.g., the data fame 300 depicted in FIG. 3) including a unique device ID and one or more opt in and opt out indicators to the third party system 110 during each access attempt. For example, each time the user device 102, as identified by its MAC address, initiates a session with one or more resources on the networks 108, for example, a session with the third party systems 110, an indication is sent to the third party system 110 letting it know whether the user associated with the user device 102 has opted out (or not) in response to one or more data privacy inquiries. In some embodiments, the user device 102 sends the data frame to the third party system 110 only during the first access attempt, or only occasionally after a predetermined amount of time or a predetermined number of accesses.

In some embodiments, the third party systems 110 retrieve these opt in and opt out indicators from the clearinghouse 112. In some embodiments, the opt in and opt out indicators are retrieved based at last in part on a unique ID associated with the user device 102. For example, the user device 102 may provide a unique ID (e.g., device ID, session ID, browser ID, etc.) to the third party systems 110 during an access attempt. The third party systems 110 may use this unique ID to poll the clearinghouse 112 for one or more opt in or opt out permissions associated with the unique ID. In some embodiments, the clearinghouse 112 retrieves the user record 116 that matches the unique ID. After the user record 116 associated with the unique ID is located, any/all of the data privacy opt ins or opt outs may be provided to the third party systems 110. In some embodiments, the user record 116 is provided to the third party system 110.

Illustrative Use Cases

There are many possible device and system configurations for managing the opt in and opt out permissions of a particular user or user device. As discussed previously herein, these permissions can be managed remotely using a clearinghouse. In some implementations, however, the access point 106 may manage these permissions. This type of configuration is particularly useful in scenarios such as those where the networks 108 are managed by one or more internet service providers (ISPs). When a user initiates a connection with the network 108 via the access point 106 (e.g., a home router or gateway), the ISP may only have access to the device ID (e.g., MAC address) of the access point 106. In other words, the ISP may not have direct access to the device ID of the user device 102. In these scenarios, the access point 106 may coordinate the data privacy opt in/out selections of the user and may provide this information to the ISP and/or the destination. In some embodiments, the access point 106 may associate the MAC address of each device in the local network with one or more opt in or opt out permission indicators.

In some embodiments, the access point 106 may receive a request during a session for a connection, such as a TCP connection, to the third party system 110 (or to any other destination via the network 108). The request may be initiated by the user device 102 within the local network managed by the access point 106. In response to receiving this request, the access point 106 can search a MAC address table stored on or by the access point 106 to determine the opt in and opt out parameters for the session. In some embodiments, the access point 106 may identify the source port from which the connection is originated (i.e., the source port associated with the user device 102). The access point 106 may then send a data frame to the destination (e.g., a requested resource, the third party systems 110, etc.) including the opt in/out indicators for the particular session.

In some embodiments, a user interface of the access point 106 may be accessed to associate one or more opt in or opt out permissions with one or more MAC addresses. The user interface may be used to set opt in or opt out permissions (e.g., user privacy settings) for a single MAC address (a single device), a range of MAC addresses (multiple devices), or all MAC addresses (household). Allowing the access point 106 to manage the opt in and opt out permissions in this manner advantageously allows for a user to easily opt in or opt out their entire household, a number of devices in the household, or individual devices, at one time.

In some embodiments, the access point 106 may manage opt in/out permissions by assigning a range of source ports to each device (e.g., the user device 102) managed by the access point 106 in the local area network. For example, source ports 50,000 to 51,000 may be assigned to the user device 102. In some embodiments, a list of these source port ranges and associated opt in/out permissions may be proactively provided by the access point 106 to the third party system 110 and/or the clearinghouse 112. In some embodiments, the third party system 110 and/or the clearinghouse 112 may access these pre-generated source port ranges and opt in/out permissions when making data privacy decisions. For example, the third party system 110 may use the list to determine that the source port ranges 1,000 to 40,000 for a particular IP address(es) have opted out of a particular data privacy permission. The use of source port ranges in this manner advantageously obviates the need for session-specific opt in/out information to be transmitted to the third party system 110. In some embodiments, an even source port (or a collection of even source ports) indicates an opt in selection, while an odd source port (or a collection of odd source ports) indicates an opt out selection, or vice versa.

In some embodiments, the opt in or opt out permission indicators are managed device-side. For example, a user interface of the user device 102 may solicit one or more opt in or opt out permissions from a user. In response, the user may provide one or more opt in or opt out permissions on the user interface of the user device 102. These permissions can then be stored on, for example, the device record 104, the user device 102, the access point 106, etc. Moreover, these permissions can be directly provided by the user device 102 to a receiving device (e.g., the third party system 110), according to one or more embodiments. Allowing the user device 102 to locally manage the opt in and opt out permissions in this manner advantageously allows the opt in and opt out permissions to persist across networks, such as when switching the user device 102 from a WiFi network to a cellular network, or when switching between two available WiFi connections.

In some embodiments, the opt in or opt out permission indicators are managed using a browser or application of the user device 102. In one implementation, the browser of the user device 102 may generate a cookie having a unique value and this cookie may be provided to the third party system 110 using a data frame according to one or more embodiments. In some embodiments, the data frame may include information for decoding or otherwise understanding what the unique value in the cookie means (e.g., whether the unique value indicates an opt in or opt out with respect to a particular data privacy permission). In other embodiments, the opt in or opt out selections are included within the cookie. In any case, browser-based management advantageously obviates the need for any operating system updates on the user device 102.

In some embodiments, the opt in or opt out permission indicators are managed via a UDP packet sent during a conventional TCP three-packet handshake. For example, a UDP packet may be sent with the first TCP packet. In this manner, the destination (e.g., the third party system 110) can receive the UDP packet before the TCP handshake is completed. In this manner, the third party system 110 can complete the TCP handshake based at least in part on the opt in and opt out information communicated using the UDP packet.

In some implementations, the opt in or opt out permission indicators are managed using domain name server (DNS) records. For example, a DNS record may be generated that redirects a receiving device or system (e.g., the third party system 110) to the location of the policy server (e.g., the clearinghouse 112). For example, a user device 102 connecting to the third party system 110 may be identified by the third party system 110 using the source IP address of the user device 102. The third party system 110 may initiate a reverse DNS name lookup based on the IP address of the user device 102 to determine that the IP address resolves to a particular ISP. In some embodiments, the third party system 110 may then initiate a special DNS query against the ISP requesting the location of the policy server (e.g., the clearinghouse 112). In response to this DNS query, the third party system 110 may be provided access details (e.g., an IP address, a redirect, etc.) to the policy server. The third party system 110 can then poll the policy server to determine the opt in/out permissions associated with the user device 102 according to one or more embodiments.

In one or more embodiments, the clearinghouse 112 may function as a compliance service for the third party systems 110. For example, the clearinghouse 112 may identify an online user request (e.g., from the user device 102) to opt into data privacy protection (e.g., to opt out of some data collection capabilities of the third party systems 110), and may communicate to the third party systems 110 that the online user of the device 102 has requested the deletion of some of the user's information (e.g., Internet browsing habits, purchase history, or even user preferences, as well as information provided or obtained through social media, likes and dislikes, etc.). In this manner, the online user may not need to provide requests to each service to opt out of data collection capabilities. For example, when the clearinghouse 112 notifies the third party systems 110 of a user's preference to opt out of data collection and/or targeted content, the third party systems 110 may need to adjust processes to avoid data collection and/or content targeting to comply with laws, regulations, and/or user preferences.

In one or more embodiments, when the third party systems 110 identify an online user, the third party systems 110 may request from the clearinghouse 112 a confirmation of whether the user has opted into data collection and/or targeted content. For example, when an online user signs into an account or enters a search query, the third party systems 110 may need to determine whether the online user has opted into data collection and/or targeted content so that the third party systems 110 can determine whether they may collect, analyze, and share the online user's information, and whether the third party systems 110 may present targeted content for the online user. The third party systems 110 may request an opt in or opt out confirmation from the clearinghouse 112, and the clearinghouse 112 may respond with an indication of which privacy protections the online user has opted into and out of, and which privacy settings the online user has selected. In this manner, the clearinghouse 112 may notify the third party systems 110 when a user has opted into or out of privacy settings, and the clearinghouse 112 may respond to requests from the third party systems 110 regarding whether the online user has opted into or out of the privacy settings.

In one or more embodiments, an online user may select an opt in/out on the device 102, and the device 102 may send the opt in/out selection to the clearinghouse 112 or to another service, device, network, or system that may provide the user opt in/out selection to the clearinghouse 112. In this manner, the clearinghouse 112 may be provided any user privacy setting the third party systems 110 request the online user's privacy settings from the clearinghouse 112.

In one or more embodiments, the clearinghouse 112 may identify an online user's IP address, the online user's account, or other information about the online user or the online user's device. Any clearinghouse service may manage privacy settings for one or more IP addresses, user account contact addresses, billing addresses, or other information. When the third party systems 110 request an online user's privacy settings from the clearinghouse 112, the third party systems 110 may indicate to the clearinghouse 112 the user's IP address or other information, allowing the clearinghouse 112 to identify the online user and the online user's privacy settings (e.g., an opt in or opt out). The clearinghouse 112 may determine where an online user lives (with applicable user consent and compliance with any laws and regulations) based on a user account, and based on the user's location (e.g., where the user lives), the clearinghouse 112 may determine whether the user has opted into or out of any relevant privacy laws or regulations for the location. The clearinghouse 112 may use browser cookies to identify a user, allowing the clearinghouse 112 to be agnostic of ISPs.

In one or more embodiments, the clearinghouse 112 may have access to ISP data, such as online users and their respective residences, IP addresses, and the like. Based on the IP address or ISP of an online user, the clearinghouse 112 may identify an online user and which opt ins and opt outs have been selected by the user and are applicable given the user's residence. A user may log into the third party systems 110, and the third party systems 110 may indicate a user's ISP address to the clearinghouse 112. A user may log into an ISP or an account with the clearinghouse 112, and the clearinghouse 112 may determine the user's location and relevant privacy settings for the location.

In one or more embodiments, the clearinghouse 112 may store rules associated with applicable laws and regulations for any jurisdiction. When the clearinghouse 112 identifies an online user and the online user's location (e.g., place of residence), the clearinghouse 112 may determine the rules for the online user's location, such as privacy, data sharing, and content targeting rules. The clearinghouse 112 may determine whether the online user has provided any opt in or opt out selections for any respective rules, and may provide an indication to one or more computer services that the third party systems 110 may or may not collect, analyze, share, or target information or content for the online user based on the online user's selections.

In one or more embodiments, with applicable consent of the third party systems 110, the clearinghouse 112 may analyze compliance of any computer service of the third party systems 110 with applicable privacy and data sharing or targeting laws and regulations. The clearinghouse 112 may send messages requesting online user feedback regarding whether a computer service of the third party systems 110 complied with laws and regulations, such as messages requesting an online user to indicate whether any violations are noticeable (e.g., whether the online user has noticed tracking or content targeting by an online system). The clearinghouse 112 may request that a computer service of the third party systems 110 provide confirmation that online user privacy settings were implemented. The clearinghouse 112 may collect information and metrics provided by online users and/or the third party systems 110, and may analyze the information to determine whether any non-compliance issues have occurred, to which laws and regulations, to which jurisdictions, which of the third party systems 110 were responsible for non-compliances, and metrics such as percentage of compliance or non-compliance. The clearinghouse 112 may report the metrics to online users and/or to the third party systems 110.

In one or more embodiments, for the clearinghouse 112 to monitor compliance of the third party systems 110, the clearinghouse 112 may create test clients (e.g., robot clients). For example, an online user may use an application or tool executing on the device 102 that, with the online user's consent, may execute and inspect the user's online traffic with the third party systems 110 (e.g., web browsers, social media, online merchants, etc.). The application or tool may provide feedback to the clearinghouse 112 indicating whether the online user's selected opt ins or opt outs are followed. For example, a web browser tool may execute with a web browser and may indicate to the clearinghouse 112 whether the online user's opt in and opt out selections are implemented or not by the third party systems 110.

In one or more embodiments, multiple clearinghouse services may perform clearinghouse service actions for monitoring and facilitating the use of online user privacy opt ins and opt outs. For any number of clearinghouse services (e.g., a network of clearinghouse services), a main clearinghouse service (e.g., the clearinghouse 112) may be used as an endpoint for the third party systems 110 requesting online user opt in and opt out information. For example, clearinghouse services may communicate to the third party systems 110 which clearinghouse service from which to request online user opt ins and opt outs. Clearinghouse services may communicate with one another to request and receive online user opt in and opt out information. For example, one clearinghouse service may provide information for an online user and/or a particular jurisdiction to another clearinghouse service.

Figure 2:
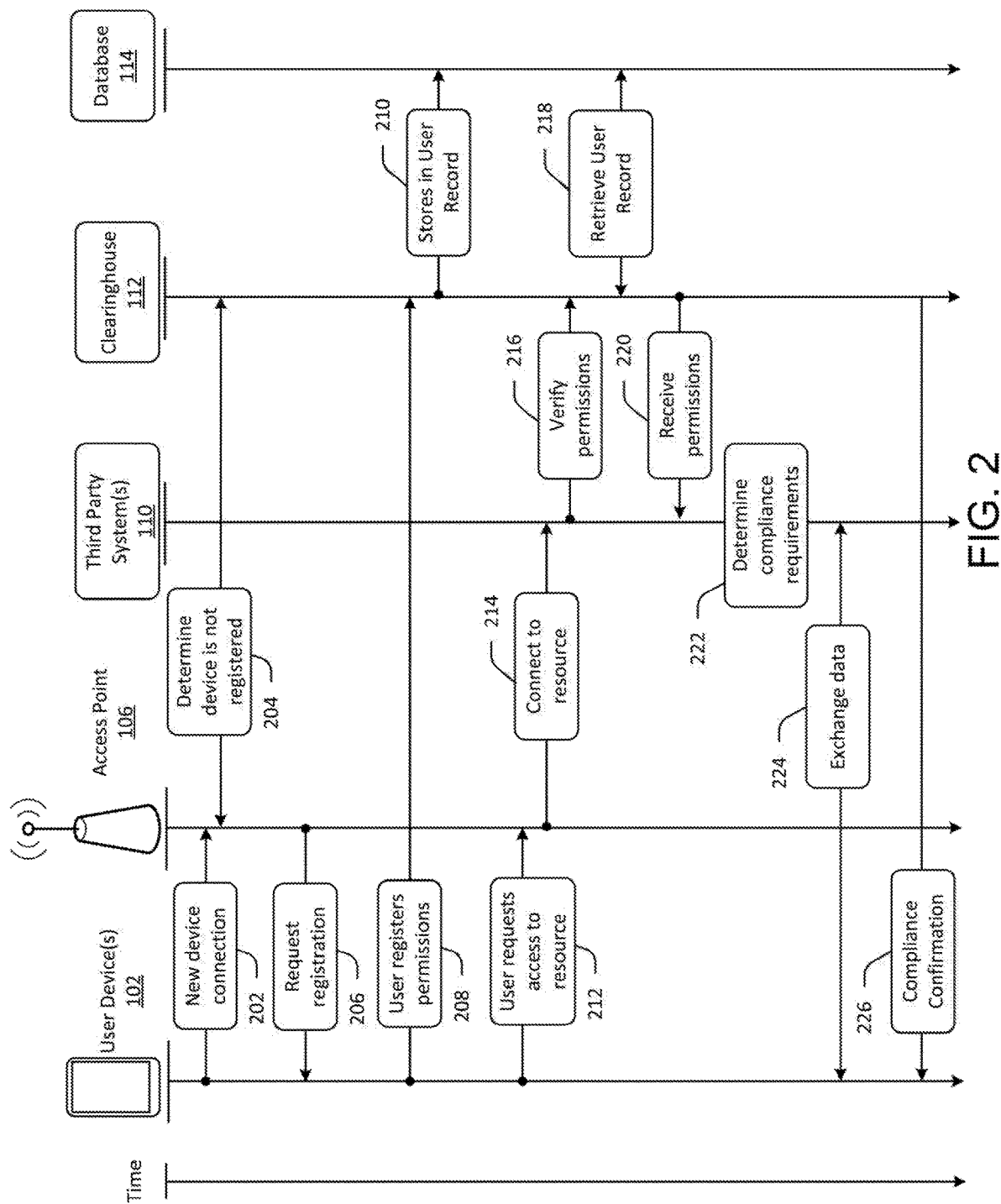
FIG. 2 schematically illustrates an example use case and an exemplary hybrid system and process diagram for managing data privacy opt in and opt out permissions, in accordance with one or more example embodiments of the disclosure.

FIG. 2 schematically illustrates an example use case and an exemplary hybrid system and process diagram for managing data privacy opt in and opt out permissions, in accordance with one or more example embodiments of the disclosure. As illustrated in FIG. 2, a user device 102 is communicatively coupled to the access point 106. The access point 106 is communicatively coupled to the third party systems 110 and the clearinghouse 112.

At block 202, the user device 102 may send a request to the access point 106 to provide a connection to the local area network. In some embodiments, the user device 102 may request the access point 106 to provide a connection for the first time. In response, the access point 106 (e.g., a home or business router, a gateway, etc.) at block 204, may determine whether the user device 102 has previously registered any data privacy opt in/out permissions. In some embodiments, the access point 106 searches a record stored on the user device 102 and/or the access point 106 for a user or user device record matching an identifier of the user device 102. In some embodiments, the access point 106 queries a remote system (e.g., the clearinghouse 112) for a user record matching an identifier of the user device 102. In some embodiments, user records are stored in a database 114 managed by the clearinghouse 112.

When the user device 102 has not previously registered data privacy opt in/out permissions, the access point 106 may, at block 206, request the user device 102 to register those permissions with the clearinghouse 112 and/or with the third party systems 110. During the registration process, at block 208, the user of the user device 102 may be presented with one or more data privacy opt in/out inquiries (e.g., as provided by the clearinghouse 112 and/or the third party systems 110). For example, the user may be presented a CCPA inquiry regarding the tracking and use of data associated with the user device 102 for monetization activity by third parties. In this manner, a consumer may be prompted as to whether the consumer opts in to allow their activity to be tracked by the third party systems 110, or opts out to prevent the tracking of their activity.

At block 210, the opt in/out permissions provided during registration are stored to a device or user record. As depicted in FIG. 2, the permissions are stored remotely in the database 114. It is understood, however, that the record of the opt in/out determination by the user may be maintained on the user device 102, by the access point 106, and/or by a central database (e.g., the clearinghouse 112 and database 114), according to one or more embodiments. The consumer's opt in and opt out selections may be particular to laws and regulations for a specific jurisdiction (e.g., the location of the consumer's residence), and the clearinghouse 112 may store the user's opt ins and opt outs as privacy settings, and/or the database 114 may store the privacy settings. The clearinghouse 112 and/or the database 114 may store location information for a consumer, and the clearinghouse 112 may match a consumer to a location and may determine the applicable opt ins and opt outs for the location.

At block 212, a user operating the user device 102 may initiate or request a session directly or via the access point 106 to exchange information with the third party systems 110. In some embodiments, the access point 106, at block 214, attempts to establish a connection to the third party system 110 via one or more networks (e.g., the network 108 depicted in FIG. 1). In some embodiments, the one or more networks are managed by an ISP.

At block 216, the third party systems 110 receives and/or verifies the opt in/out permissions associated with the user device 102. For example, the third party systems 110 may provide consumer information (e.g., an indication of the consumer's user account and location) to the clearinghouse 112. In some embodiments, at block 218, the clearinghouse 112 retrieves or otherwise accesses a user record (e.g., including privacy settings) stored in the clearinghouse 112 or the database 114. The user record may be retrieved using, for example, a unique ID associated with the user device 102 and/or the user's online account and provided by the user device 102 and/or access point 106, according to one or more embodiments. The clearinghouse 112 may determine a location of the consumer and may determine privacy settings relevant to the location (e.g., which opt ins and opt outs the user has selected for the location, such as applicable laws for a given jurisdiction). At block 220, a user record and/or opt in/out permissions associated with the user device 102 and stored in the database 114 are provided to the third party systems 110.

As depicted in FIG. 2, the third party systems 110 verify the data privacy opt in/out permissions by querying the clearinghouse 112. It is understood, however, that the permissions can be verified or otherwise identified according to one or more embodiments. For example, in some embodiments an indication (e.g., the data frame 300 depicted in FIG. 3) is sent by the user device 102 or the access point 106 to the third party system 110 letting the third party system 110 know the user associated with the user device 102 has opted out (or not) in response to one or more data privacy inquiries. In some embodiments, this indication is provided each time the user device 102, as identified by its unique identifier (e.g., a MAC address), initiates a session on an ISP network with a third party system (e.g., the third party system 110) outside the ISP network. In some embodiments, the indication may be a UDP packet or a customized flag. In some embodiments, the indication may include the MAC address or other unique identifier and an indication of the user's opting in/out determination.

In some embodiments, the indication merely informs the third party system 110 that data privacy opt in/out permissions have been registered for the user device 102. In response to receiving this indication, the third party system 110 may, for example, inquire directly with the ISP or the clearinghouse 112 for more information pertaining to these permissions according to one or more embodiments.

Regardless of the method used to identify the data privacy opt in/out permissions associated with the user device 102, the third party system 110, at block 222, will determine the compliance requirements associated with the data privacy opt in/out permissions. In other words, the third party system 110 may take action (e.g., track or not track) based at least in part on the retrieved opt in/out permission values. In some embodiments, the third party system 110 receives additional contextual information associated with the opt in/out permissions. For example, the additional contextual information may describe the compliance requirements associated with a particular opt in/out permission (e.g., an opt out of this parameter means that the user device 102 may not be tracked). In some embodiments, contextual information associated with the opt in/out parameters are predetermined and form part of a data privacy opt in/out standard having universally agreed upon meanings. For example, the first bit in a user record may always indicate an opt in/out with respect to a specific CCPA permission, such as a right to track.

In some embodiments, once the compliance requirements are understood by the third party system 110, data may be exchanged, at block 224, with the user device 102.

At block 226, the clearinghouse 112 may send compliance information 226 to the user device 102. For example, the clearinghouse 112 may indicate to the user device 102 and/or to the third party systems 110 whether the third party systems 110 (e.g., with proper consent) have complied with privacy settings of the online user for a privacy regulation.

Figure 3:
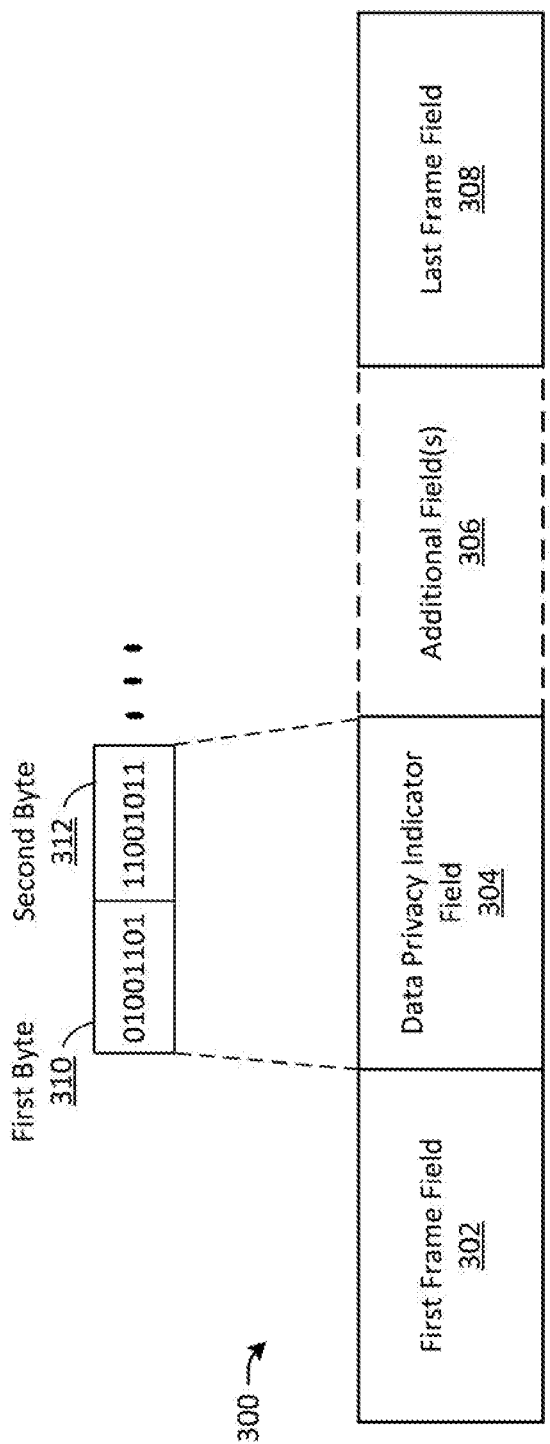
FIG. 3 is a schematic diagram illustrating an exemplary data frame for communicating data privacy opt in/out permissions, in accordance with one or more example embodiments of the disclosure.

FIG. 3 is a schematic diagram illustrating an exemplary data frame 300 for communicating data privacy opt in/out permissions, in accordance with one or more example embodiments of the disclosure. As discussed previously herein, data privacy opt in and opt out indicators may be transmitted from a source (e.g., the user device 102 or the access point 106) to a destination (e.g., the third party system 110) using a data frame. As depicted in FIG. 3, the data frame 300 may include a first frame field 302, a data privacy indicator field 304, one or more additional fields 306, and a last frame field 308. While depicted as a separate field in the data frame 300 for ease of illustration, it is understood that the data privacy indicator field 304 or the data contained therein may instead be incorporated into any field (e.g., the first frame field 302) of the data frame 300.

In some embodiments, the data privacy indicator field 304 includes one or more bytes for communicating opt in/out selections. As depicted in FIG. 3, the data frame 300 includes a first byte 310 and a second byte 312. It is understood, however, that the data frame 300 may be structured as any number of bytes, or even as a single bit.

In some embodiments, each bit in the data privacy indicator field 304 is associated with a particular data privacy law opt in/opt out decision. In this manner, the data frame 300 can efficiently communicate a single opt in/out selection or a large number of data privacy opt in/out selections without requiring a large data overhead. For example, the third bit in the first byte 310 (having value "0" as depicted in FIG. 3) may indicate an opt out with respect to a particular CCPA provision. In some embodiments, each bit in the data privacy indicator field 304 is associated with a data privacy opt in/opt out decision for a particular destination (e.g., a website).

In some embodiments, the data privacy indicator field 304 includes one or more bytes for communicating an identifier, such as a user ID or device ID, associated with the opt in/out permissions in the data privacy indicator field 304. In some embodiments, the identifier is a MAC address. In some embodiments, the identifier is a unique device ID generated by the access point 106 during initial device registration (i.e., during the initial connection of the user device 102 to the local area network). In some embodiments, the identifier includes data for uniquely identifying the current session (e.g. a TCP session). For example, the identifier may include a TCP sequence number, a source port of the access point 106, and/or a source port of the user device 102. In some embodiments, the identifier may include both a TCP sequence number and the source port of the access point 106 or the user device 102. In addition to ensuring that the session is uniquely identifiable, providing both a TCP sequence number and a source port ensures that the session is not spoofable. This is particularly useful when using a UDP configuration, as the source address may not be verifiable when using UDP packets.

In some embodiments, the data privacy indicator field 304 includes a globally unique identifier (also referred to as a "policy identifier"). For example, the globally unique identifier may be associated with a unique user record of a specific data privacy clearinghouse (e.g., the user record 116 of the clearinghouse 112 depicted in FIG. 1). In some embodiments, the globally unique identifier is generated by the clearinghouse in response to receiving a first opt in/out selection for a user or user device. The globally unique identifier can be stored in a database record managed or accessible by the clearinghouse (e.g., the user record 116). The globally unique identifier may be provided to the user device 102 to streamline retrieval of the user record 116. In some embodiments, the data privacy indicator field 304 only includes the globally unique identifier, and the receiving device or system (e.g., the third party system 110) uses the globally unique identifier to retrieve the opt in/out selections for the particular session from the clearinghouse 112.

In some embodiments, the globally unique identifier is the IP address of the user device 102. Using the IP address in this manner allows for the third party system 110 to make data privacy decisions for the user device 102 at the IP address-level, rather than at the session level. For example, the third party system 110 can decide not to track a particular IP address regardless of the session-specific data privacy data.

Figure 4A:
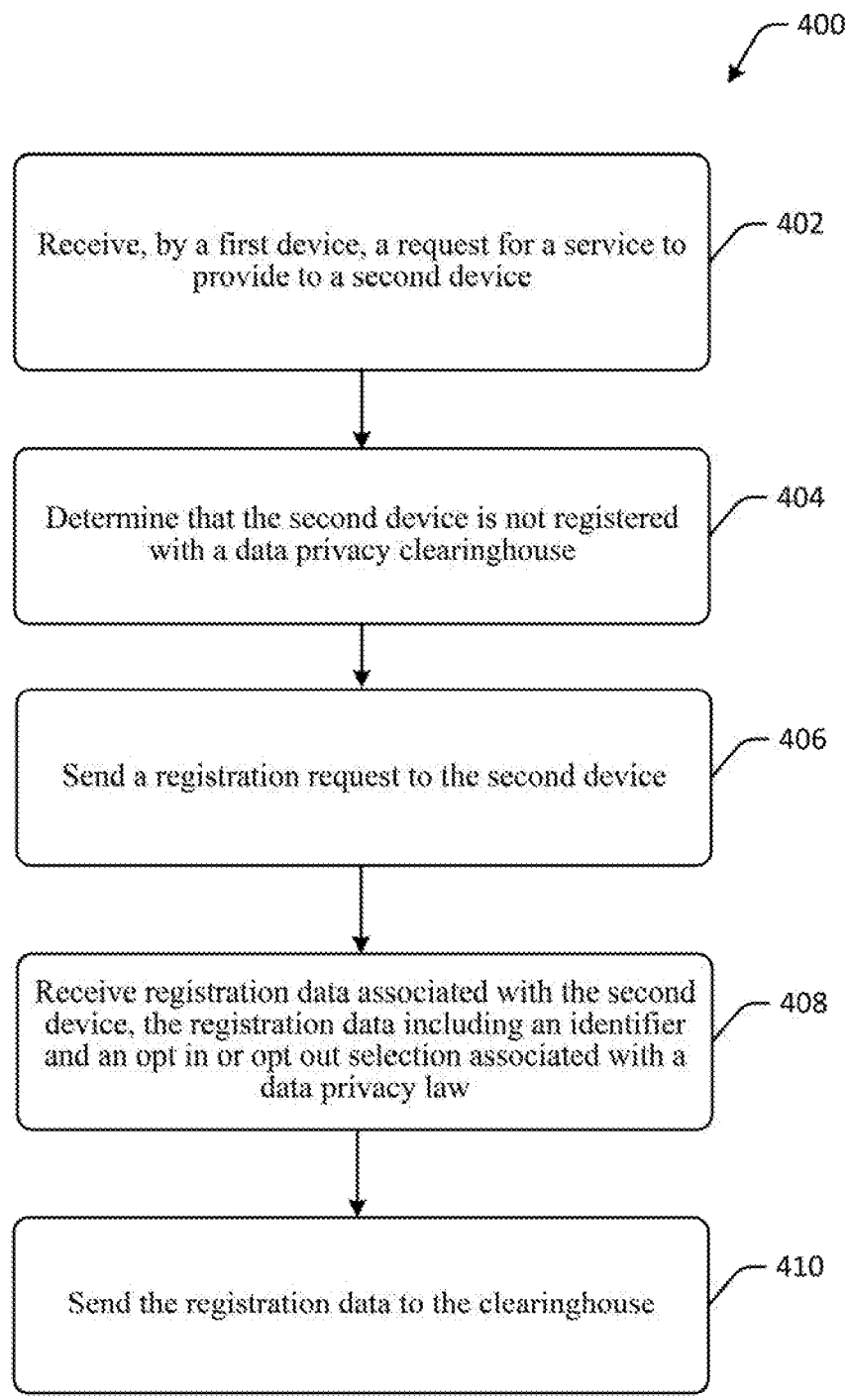
FIG. 4A is a process flow diagram of an illustrative process for managing data privacy opt in and opt out permissions, in accordance with one or more example embodiments of the disclosure.

FIG. 4A is a process flow diagram of an illustrative process 400 for managing data privacy opt in and opt out permissions, in accordance with one or more example embodiments of the disclosure.

At block 402, a first device (e.g., the access point 106 of FIG. 1) may receive a request from a second device (e.g., the user device 102 of FIG. 1) to establish a connection. In some embodiments, the requested connection is a connection with a local area network managed by the first device.

At block 404, the first device may determine that the second device is not registered with a data privacy clearinghouse (e.g., the clearinghouse 112 of FIG. 1). In some embodiments, the first device sends a registration query to the clearinghouse. In some embodiments, the registration query includes a unique identifier associated with the second device (e.g., a MAC address of the user device 102). In some embodiments, the first device receives a response from the clearinghouse indicating that the second device is not registered with the clearinghouse.

At block 406, the first device may send a registration request to the second device. The registration request may include opt in and opt out options relative to a location of the second device or a location of the user of the second device. For example, when the user lives in a first state or country, the request may provide opt in and opt out options for one or more privacy laws. By selecting an opt in, the online user's selection may indicate that the user prefers to be protected by a privacy law. When the user lives in a second state or country, the privacy laws may be different than the first state or country, or the second state or country may lack any such privacy laws. The clearinghouse 112 of FIG. 1, for example, may determine which privacy laws and respective opt in and opt out options to present the user based on which laws are applicable where the user lives.

In response to the registration request, the first device may receive, at block 408, registration data associated with the second device. The registration data may include an identifier (e.g., a MAC address) and an opt in or opt out selection associated with a data privacy law (e.g., an opt out of a CCPA data tracking provision). The opt ins or opt outs may be privacy settings indicating whether a user has opted into or out of privacy law protections for a given jurisdiction.

At block 410, the first device may send the registration data to the clearinghouse, according to one or more embodiments. In some embodiments, the clearinghouse generates a user record based at least in part on the identifier. In some embodiments, the user record includes one or more data privacy opt in/out permissions and location information.

One or more operations of the process 400 may have been described as being performed by one or more components of a system, such as the access point 106 of FIG. 1, or more specifically, by one or more program modules executing on such components. It should be appreciated, however, that any of the operations of the process 400 described as being performed by a particular component or a particular program module executing thereon may be performed by another component or another program module executing thereon. In addition, it should be appreciated that processing performed in response to execution of computer-executable instructions provided as part of an application, program module, or the like may be described herein as being performed by the application or the program module itself, by a device on which the application, program module, or the like is executing, or by a system that includes such a device. While the operations of the process 400 are described in the context of the illustrative system 100 of FIG. 1, it should be appreciated that the method may be implemented in connection with numerous other architectural and device level configurations.

Figure 4B:
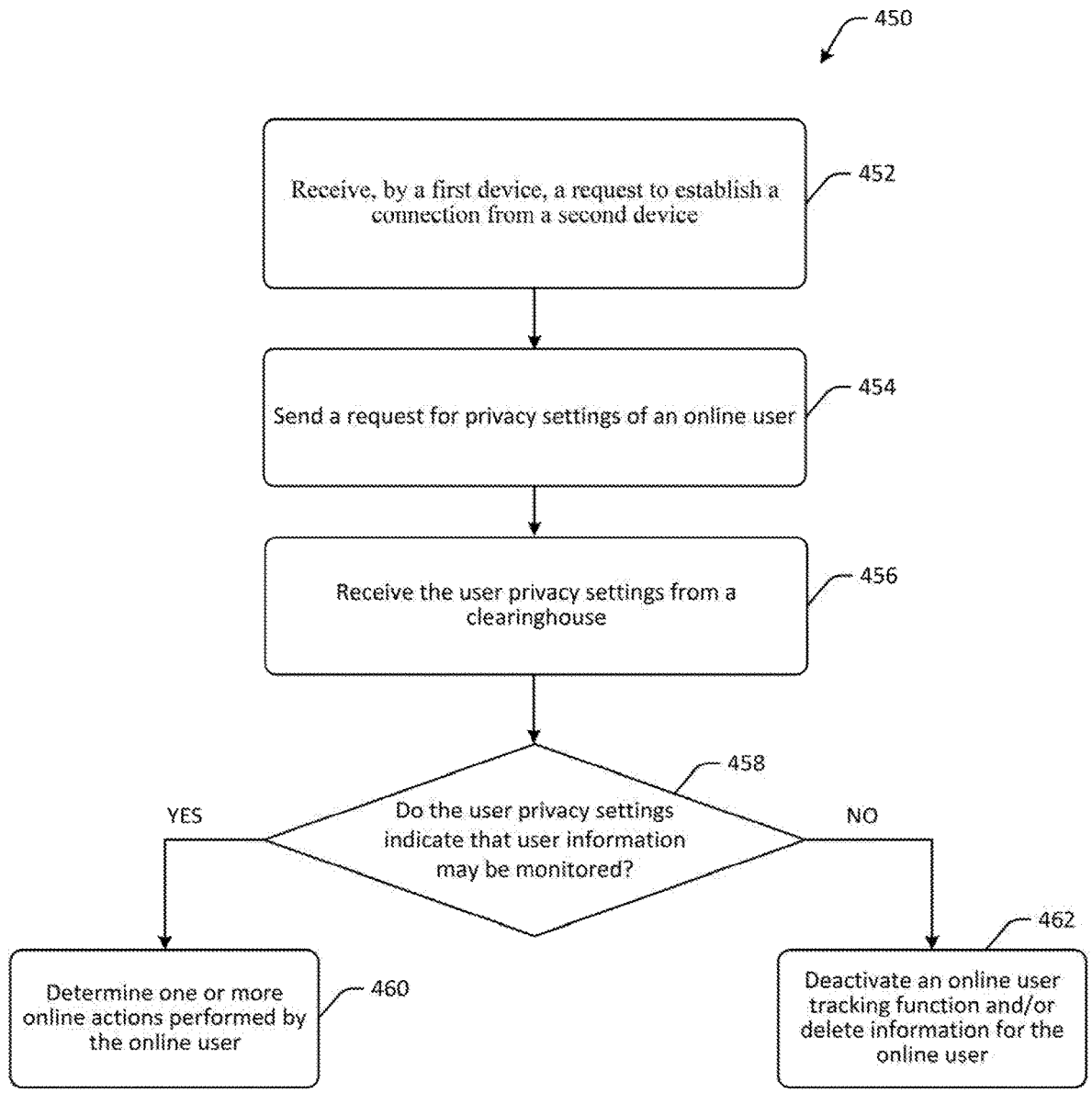
FIG. 4B is a process flow diagram of an illustrative process for managing data privacy opt in and opt out permissions, in accordance with one or more example embodiments of the disclosure.

FIG. 4B is a process flow diagram of an illustrative process 450 for managing data privacy opt in and opt out permissions, in accordance with one or more example embodiments of the disclosure.

At block 452, a first device (e.g., the third party systems 110 of FIG. 1) may receive a request from a second device (e.g., the user device 102 or the access point 106 of FIG. 1) to provide a service or resource to a second device. For example, the device may provide websites, user interfaces, applications, social media platforms, and other online content. The request may identify an online user and a location of the user.

At block 454, the first device may send a request for privacy settings of the online user identified by the request from the second device. The first device may send the request to a clearinghouse (e.g., the clearinghouse 112 of FIG. 1), and may indicate the online user and a location of the online user. The first device may request privacy settings for the user, such as the user's opt ins and opt outs for the location.

At block 456, the first device may receive the user privacy settings from the clearinghouse. The privacy settings may be determined based on which laws apply to the location, and whether the online user has opted into or out of the respective laws.

At block 458, the first device may determine whether the user privacy settings indicate that user information (Internet browsing habits, purchase history, or even user preferences, as well as information provided or obtained through social media, likes and dislikes, etc.) may be monitored. The privacy settings for the online user may indicate which laws with which the first device must comply based on the online user's opt ins and opt outs. When the online user's opt ins and opt outs allow some user information to be monitored, the process 450 may continue to block 460. When the online user's opt ins and opt outs do not allow some user information to be monitored, the process 450 may continue to block 462.

At block 460, the first device may monitor and determine one or more user actions performed by the online user. For example, the user actions may include Internet browsing habits, purchase history, or even user preferences, as well as information provided or obtained through social media, likes and dislikes, page views, ad or other content views (e.g., impressions, interactions, etc.), and the like.

At block 462, the first device may deactivate or otherwise disable one or more online tracking functions for the online user. For example, the first device may prevent some actions or data of the online user from being monitored, tracked, logged, shared with other devices or services, and the like, according to the respective privacy laws of an opt in or opt out. The privacy settings may require the first device to delete information for the online user from one or more locations.

Figure 4C:
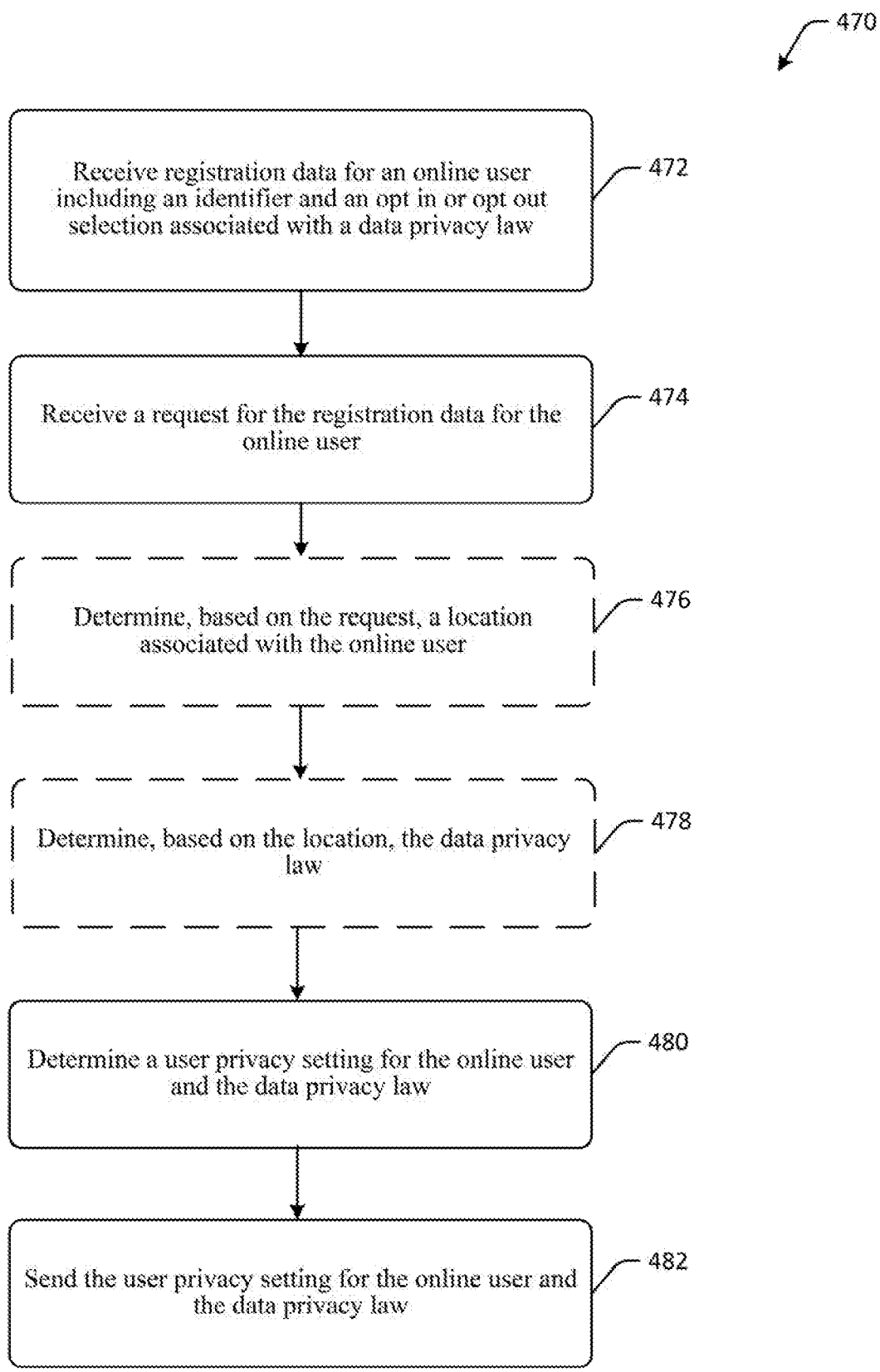
FIG. 4C is a process flow diagram of an illustrative process for managing data privacy opt in and opt out permissions, in accordance with one or more example embodiments of the disclosure.

FIG. 4C is a process flow diagram of an illustrative process 470 for managing data privacy opt in and opt out permissions, in accordance with one or more example embodiments of the disclosure.

At block 472, a device (e.g., the clearinghouse 112 of FIG. 1) may receive registration data for an online user. The registration data may include an identifier for the online user and/or a device of the online user (e.g., the user device 102 of FIG. 2). The registration data also may include one or more privacy settings, such as opt in and opt out selections for respective privacy laws. The device may store the registration data and/or may provide the registration data to a remote storage (e.g., the database 114 of FIG. 2).

At block 474, the device may receive a request for the registration data for the online user (e.g., as in block 216 of FIG. 2). The request may identify the online user and the location of the online user, or the device may determine the location of the online user based on the request's identification of the online user (e.g., the device may identify the online user based on the request, and may identify information stored at the device or at the database for the online user, the information including the online user's location). At block 476, the device may determine, based on the request, a location associated with the online user (e.g., the state, country, or other location of the online user's residence). The device may have access to the online user's IP address or other information (e.g., a billing or contact address), or the request may provide the location information.

At block 478, the device may determine, based on the location of the online user, the data privacy laws applicable to the online user. The device may identify the applicable laws for a given location and may determine which opt ins and opt outs that the online user has selected are applicable to the location. In some embodiments, the device may determine the online user's opt in and opt out selections as privacy settings, and may identify the privacy settings relevant to the online user's location. The device requesting the privacy settings (e.g., the third party systems 110 of FIG. 1) may not have access to the online user's location of residence, and therefore may be unable to determine which privacy laws and their respective rules/conditions to apply to a given online user. The device receiving the request for privacy settings may have access to the online user's location of residence, however, and may determine which opt ins and opt outs the online user has selected.

At block 480, the device may determine a user privacy setting for the online user and any relevant data privacy law. The device may determine relevant data privacy laws given to an online user and a location of the online user or may determine any data privacy law opt in or opt out (e.g., privacy setting) selected by an online user. The device may determine the restrictions and requirements of any data privacy law opted into or out of by an online user. For example, an online user selection of an opt in or opt out of a privacy law may require that some information about the online user (e.g., account information, location information, demographic information, browsing history, purchase history, etc.) be deleted, restricted, anonymized, not shared, or the like.

At block 482, the device may send the privacy setting for the online user and any applicable data privacy law. For example, the device may send an indication of the specific laws or regulations into which the online user has opted or out of which the online user has opted. The device may send instructions indicating which data associated with the online user may be monitored, analyzed, shared, and the like, and which information must be deleted, protected, not shared, anonymized, and the like. The device may monitor compliance of other devices and services, with proper consent, of relevant privacy laws which restrict the use of data of the online user. The devices and services may provide data indicating their compliance, the online user may provide feedback regarding whether the devices and services complied, and/or an application or tool may be executed on a device operated by the online user to monitor information that is being tracked or analyzed by the devices and services, and the application or tool may provide the information to the device for compliance analysis.

In addition, it should be appreciated that the operations described and depicted in FIGS. 4A-4C may be carried out or performed in any suitable order as desired in various embodiments of the disclosure. Additionally, in certain embodiments, at least a portion of the operations may be carried out in parallel. Furthermore, in certain embodiments, less, more, or different operations than those depicted in FIGS. 4A-4C may be performed.

Figure 5:
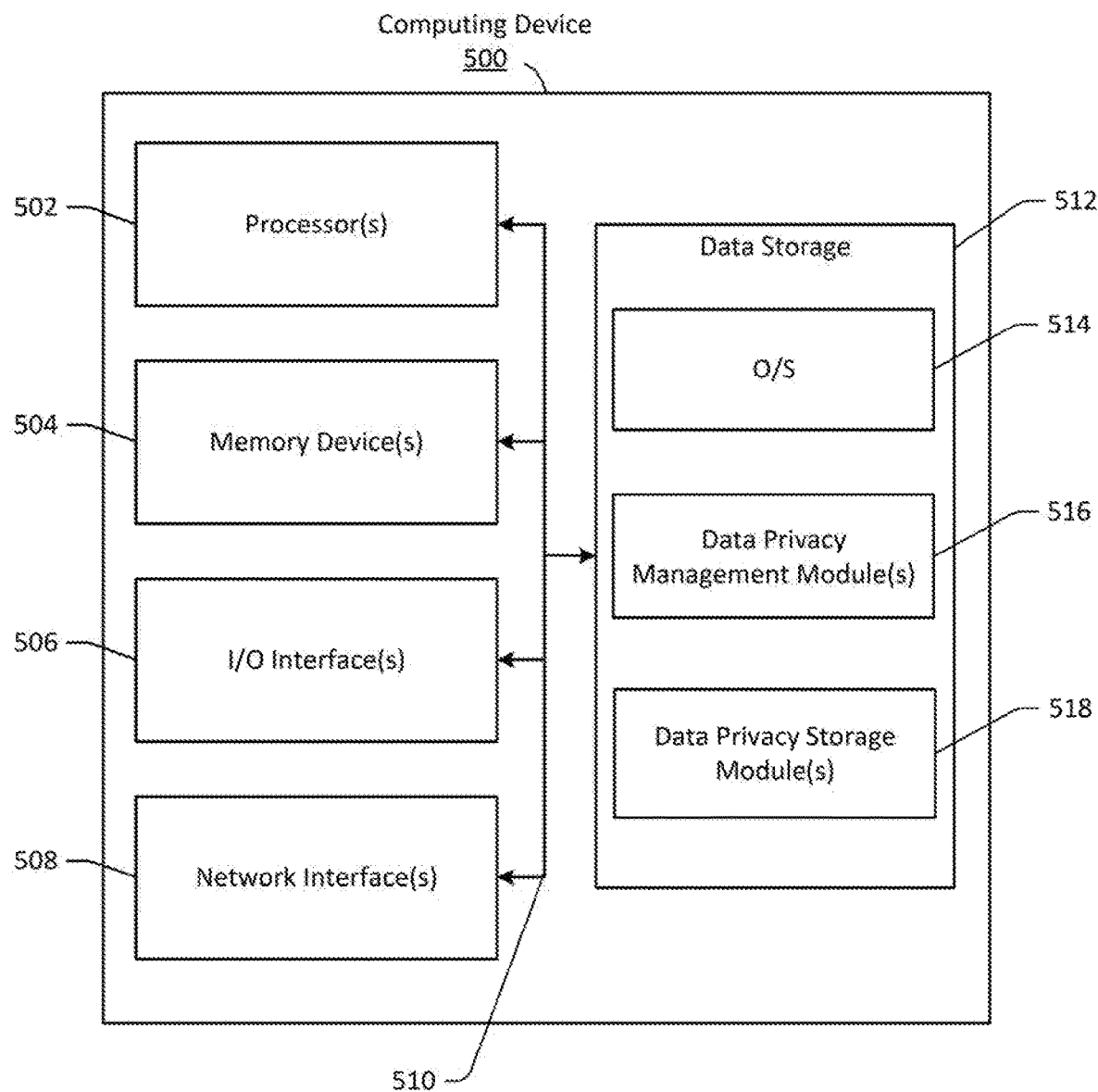
FIG. 5 is a schematic diagram illustrating a computing device for managing data privacy opt in and opt out permissions, in accordance with one or more example embodiments of the disclosure.

FIG. 5 is a schematic block diagram of an example computing device for managing data privacy opt in and opt out permissions, in accordance with one or more example embodiments of the disclosure. In an illustrative configuration, the computing device 500 (e.g., one or more of the user device 102, the access point 106, the third party system 110, and/or the clearinghouse 112 of FIG. 1) may include one or more processors (processor(s)) 502, one or more memory devices 504 (generically referred to herein as memory 504), one or more input/output ("I/O") interface(s) 506, one or more network interfaces 508, and data storage 512. The computing device 500 may further include one or more buses 510 that may functionally couple various components of the computing device 500. These various components will be described in more detail hereinafter.

The bus(es) 510 may include at least one of a system bus, a memory bus, an address bus, or a message bus, and may permit exchange of information (e.g., data (including computer-executable code), signaling, etc.) between various components of the device 500. The bus(es) 510 may have any of a variety of bus structures including, without limitation, a memory bus or a memory controller, a peripheral bus, an accelerated graphics port, and so forth. The bus(es) 510 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, a Serial Peripheral Interface architecture, and so forth.

The memory 504 of the device 500 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 504 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 504 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 512 may include removable storage and/or non-removable storage including, but not limited to, magnetic storage, optical disk storage, and/or tape storage. The data storage 512 may include, for example, memory cards, USB flash drives, external hard disk drives, optical discs, and so forth. The data storage 512 may provide non-volatile storage of computer-executable instructions and other data. The memory 504 and the data storage 512, removable and/or non-removable, are examples of computer-readable storage media (CRSM) as that term is used herein.

The data storage 512 may store computer-executable code, instructions, or the like that may be loadable into the memory 504 and executable by the processor(s) 502 to cause various operations to be performed. In certain example embodiments, computer-executable code stored in the data storage 512 may be executable by the processor(s) 502 directly from the data storage 512. The data storage 512 may additionally store data that may be copied to memory 504 for use by the processor(s) 502 during the execution of the computer-executable instructions. Moreover, output data generated as a result of execution of the computer-executable instructions by the processor(s) 502 may be stored initially in memory 504, and may ultimately be copied to data storage 512 for non-volatile storage.

More specifically, the data storage 512 may store one or more operating systems (O/S) 514; one or more data privacy management module(s) 516; and one or more data privacy storage module(s) 518. Any of the modules depicted in FIG. 5 may include computer-executable code, instructions, or the like that may be loaded into the memory 504 for execution by one or more of the processor(s) 502. The one or more data privacy management module(s) 516 may be able to perform operations as described herein, such as the operations described in FIGS. 1-4C.

The processor(s) 502 may be configured to access the memory 504 and execute computer-executable instructions loaded therein. For example, the processor(s) 502 may be configured to execute one or more computer-executable instructions of the various program modules of the device

500 to cause and/or facilitate various operations to be performed in accordance with one or more embodiments of the disclosure. The processor(s) 502 may include any suitable processing unit capable of accepting data as input, processing the input data in accordance with stored computer-executable instructions, and generating output data. The processor(s) 502 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 502 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 502 may be capable of supporting any of a variety of instruction sets.

Referring now to functionality that may be supported by the various program modules depicted as being stored in the data storage 512, the data privacy management module(s) 516 and/or the data privacy storage module(s) 518 may include computer-executable code, instructions, or the like for managing and storing data privacy opt in/out permissions. Additionally, or alternatively, the data privacy management module(s) 516 may include computer-executable code, instructions, or the like for monitoring and generating one or more user or device records for storing the opt in/out permissions.

Referring now to other illustrative components depicted in FIG. 5 as being stored in the data storage 512, the O/S 514 may be loaded from the data storage 512 into the memory 504 and may provide an interface between other application software executing on the computing device 500 and hardware resources of the computing device 500. More specifically, the O/S 514 may include a set of computer-executable instructions for managing hardware resources of the computing device 500 and for providing common services to other application programs (e.g., managing memory allocation among various application programs). The O/S 514 may include any operating system now known or which may be developed in the future including, but not limited to, any proprietary or non-proprietary operating system (e.g., a Linux based operating system).

Referring now to other illustrative components of the computing device 500, one or more input/output (I/O) interfaces 506 may be provided that may facilitate the receipt of input information by the computing device 500 from one or more I/O devices as well as the output of information from the computing device 500 to the one or more I/O devices. The I/O devices may include, for example, one or more user interface devices that facilitate interaction between a user and the computing device 500 including, but not limited to, a display, a keypad, a pointing device, a control panel, a touch screen display, a remote control device, a microphone, a speaker, and so forth. The I/O devices may further include, for example, any number of peripheral devices such as data storage devices, printing devices, and so forth. The computing device 500 may further include one or more network interfaces 508 via which the computing device 500 may communicate with any of a variety of other systems, platforms, networks, devices, and so forth. The input/output interface(s) 506 and/or the network interface(s) 508 may include or otherwise facilitate communication via any of a variety of types of serial or parallel ports including, without limitation, an Ethernet port, a USB port, a High-Definition Multimedia Interface (HDMI) port, a Video Graphics Array (VGA) port, a coaxial RF connector (female), and so forth.

The network interface(s) 508 may facilitate communication between the computing device 500 and one or more other devices via any suitable type of network. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

It should be appreciated that the program modules, applications, computer-executable instructions, code, or the like depicted in FIG. 5 as being stored in the data storage 512 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the computing device 500, and/or hosted on other computing device(s) accessible via one or more networks, may be provided to support functionality provided by the program modules, applications, or computer-executable code depicted in FIG. 5 and/or additional or alternate functionality. Further, functionality may be modularized differently such that processing described as being supported collectively by the collection of program modules depicted in FIG. 5 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 5 may be implemented, at least partially, in hardware and/or firmware across any number of devices.

It should further be appreciated that the computing device 500 may include alternate and/or additional hardware, software, or firmware components beyond those described or depicted without departing from the scope of the disclosure. More particularly, it should be appreciated that software, firmware, or hardware components depicted as forming part of the computing device 500 are merely illustrative and that some components may not be present or additional components may be provided in various embodiments. While various illustrative program modules have been depicted and described as software modules stored in data storage, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers), data storage (e.g., file management) routines, other common routines and services, etc.), or third-party software components (e.g., middleware, encryption or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may also invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method comprising:
   receiving, by one or more computer processors coupled to at least one memory of a clearinghouse device, a request from a third-party device to verify that a user has opted into or out of one or more privacy settings for use by the third-party device to determine whether the third-party device is permitted to monitor the user's use of the third-party device, wherein the request comprises an identifier associated with the user;
   querying, by the one or more computer processors and based on the identifier associated with the user, a database to obtain a user record comprising a plurality of privacy settings, wherein the plurality of privacy settings comprises the one or more privacy settings;
   determining, by the one or more computer processors, a user location associated with a user device, wherein the third-party device is prohibited from accessing the user location;
   determining, by the one or more computer processors and based on the user location, a privacy law;
   determining, by the one or more computer processors, that the one or more privacy settings of the plurality of privacy settings are applicable according to the privacy law;
   determining, by the one or more computer processors, that the user has opted into or out of the one or more privacy settings; and
   sending, by the one or more computer processors to the third-party device, an indication that the user has opted into or out of the one or more privacy settings.

2. The method of claim 1, wherein determining that the user has opted into or out of the one or more privacy settings comprises determining first information associated with the user to be deleted by the third-party device.

3. The method of claim 1, wherein determining that the user has opted into or out of the one or more privacy settings comprises determining first information associated with the user that the third-party device is permitted to monitor.

4. The method of claim 1, wherein sending the indication that the user has opted into or out of the one or more privacy settings comprises sending an indication of the privacy law.

5. The method of claim 1, wherein sending the indication that the user has opted into or out of the one or more privacy settings comprises sending an indication of a restriction, the restriction associated with the privacy law and the user.

6. The method of claim 1,
   wherein the clearinghouse device is associated with determining whether the user has opted into or out of a second setting for use by one or more additional devices to determine whether the one or more additional devices are permitted to monitor the user's use of the one or more additional devices.

7. The method of claim 1, wherein the request is associated with a second device, further comprising receiving, from the third-party device, the one or more privacy settings.

8. The method of claim 1, further comprising determining that the third-party device complied with the one or more privacy settings.

9. The method of claim 1, further comprising determining that the third-party device failed to comply with the one or more privacy settings.

10. The method of claim 1, wherein determining that the user has opted into or out of the one or more privacy settings comprises determining that the user has opted into the one or more privacy settings, and wherein the indication that the user has opted into the one or more privacy settings indicates that the third-party device is permitted to monitor the user's use of the third-party device based on the privacy law.

11. The method of claim 1, wherein determining that the user has opted into or out of the one or more privacy settings comprises determining that the user has opted out of the one or more privacy settings, and wherein the indication that the user has opted out of the one or more privacy settings indicates that the third-party device is not permitted to monitor the user's use of the third-party device based on the privacy law.

12. The method of claim 1, wherein the request is a first request based on a second request received from the user, by the third-party device, to access a resource provided by the third-party device.

13. A system comprising:
   at least one memory; and
   at least one processor coupled to the at least one memory, the at least one processor configured to:
   receive, at a clearinghouse device, a request from a third-party device to verify that a user has opted into or out of one or more privacy settings for use by the third-party device to determine whether the third-party device is to monitor the user's use of the third-party device, wherein the request comprises an identifier associated with the user;

query, based on the identifier associated with the user, a database to obtain a user record comprising a plurality of privacy settings, wherein the plurality of privacy settings comprises the one or more privacy settings;

determine a user location associated with a user device, wherein the third-party device is prohibited from accessing the user location;

determine, based on the user location, a privacy law;

determining that the one or more privacy settings of the plurality of privacy settings are applicable according to the privacy law;

determine that the user has opted into or out of the one or more privacy settings; and send, to the third-party device, an indication that the user has opted into or out of the one or more privacy settings.

14. The system of claim 13, wherein to determine that the user has opted into or out of the one or more privacy settings comprises the at least one processor being further configured to determine first information associated with the user to be deleted by the third-party device.

15. The system of claim 13, wherein to determine that the user has opted into or out of the one or more privacy settings comprises the at least one processor being further configured to determine first information associated with the user that the third-party device is permitted to monitor.

16. The system of claim 13, wherein to send the indication that the user has opted into or out of the one or more privacy settings comprises the at least one processor being further configured to send an indication of a restriction, the restriction associated with the privacy law and the user.

17. A non-transitory computer-readable medium storing computer-executable instructions which when executed by one or more processors result in performing operations comprising:

receiving, by a clearinghouse device, a request from a third-party device to verify that, a user has opted into or out of one or more privacy settings for use by the third-party device to determine whether the third-party device is permitted to monitor the user's use of the third-party device, wherein the request comprises an identifier associated with the user;

querying, based on the identifier associated with the user, a database to obtain a user record comprising a plurality of privacy settings, wherein the plurality of privacy settings comprises the one or more privacy settings;

determining a user location associated with a user device, wherein the third-party device is prohibited from accessing the user location;

determining, based on the user location, an applicable privacy law;

determining that the one or more privacy settings of the plurality of privacy settings are applicable according to the privacy law;

determining that the user has opted into or out of the one or more privacy settings; and sending, to the third-party device, an indication that the user has opted into or out of the one or more privacy settings.

* * * * *